Figures 1, 2, 3:
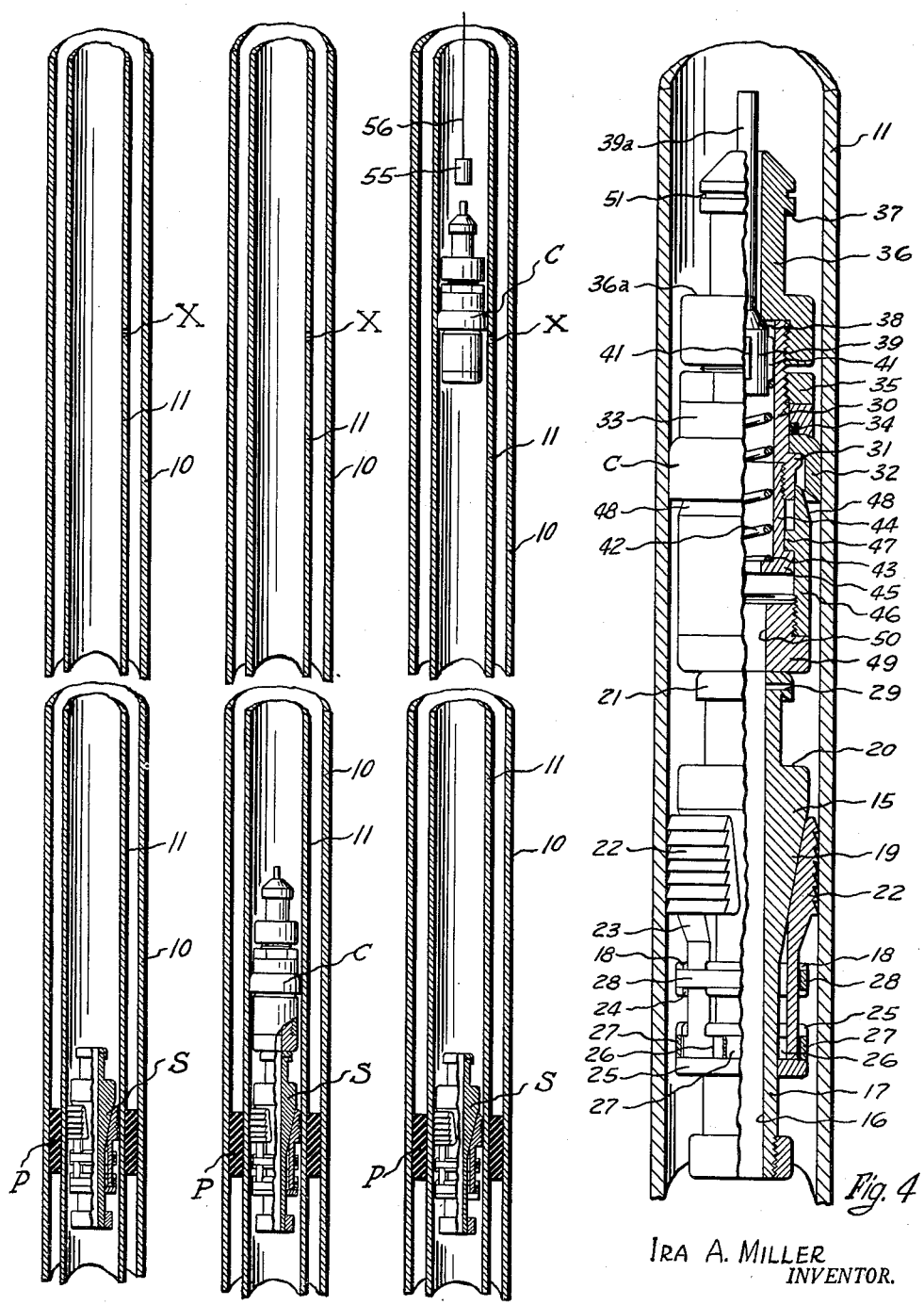

IRA A. MILLER
INVENTOR.

Patented Mar. 13, 1951

2,545,102

UNITED STATES PATENT OFFICE 2,545,102

MEANS FOR LOCATING LEAKS IN WELL PIPES

Ira A. Miller, Dallas, Tex.

Application November 17, 1947, Serial No. 786,529

5 Claims. (Cl. 73—40.5)

1

This invention relates to new and useful improvements in methods and means for locating leaks in well pipes.

It sometimes happens that leaks develop in the flow conductors in place in producing wells. Such leaks may be caused by corrosion of the well conductor, by faulty fitting of threads at couplings and the like, by erosion, by electrolytic action, or from other causes. It is extremely difficult to determine the exact position of the leak with the conductors in place in the well, and it is very often impracticable to remove the conductor from the well to locate the leak.

It is, therefore, one object of this invention to provide an improved method for locating leaks in well flow conductors while the conductors are positioned within the well.

An important object of the invention is to provide an improved method for locating leaks in well flow conductors, wherein a movable closure is inserted in the conductor below the leak and is caused to be flowed upwardly in the conductor by the natural well fluid pressure and stop at a position immediately above the leak, whereby the position of the movable closure may be determined by measurement to determine the position of the leak in the conductor.

Another object of the invention is to provide a method of the character set forth which may be employed effectively to successively locate a plurality of leaks in the well flow conductor.

A further object of the invention is to provide a method for locating leaks in a well conductor which may be carried out quickly without disturbing or interfering with the well casing, tubing or other permanent parts of the well installation.

It is also an object of the invention to provide an improved movable closure adapted to be inserted in the well flow conductor and to be flowed upwardly therein by the well fluid pressure to indicate the position of the leak in the conductor.

A particular object of the invention is to provide an improved movable closure member, of the character described, having sealing means which is initially ineffective, whereby the closure may be readily lowered into the conductor past the leak or past slight projections on the wall of the conductor; said closure member also having means for positively expanding the sealing means to sealing position to prevent excessive flow of fluids from the well.

Still another object of the invention is to provide an apparatus of the character described which may be readily employed and which may

2 be wholly withdrawn from the well flow conductor at the termination of the operations, whereby normal functioning of the well is not interfered with or altered.

Additional objects and advantages of the invention will readily be apparent from the reading of the following description of the method and apparatus for carrying out the same in accordance with the invention, and reference to the accompanying drawings thereof, wherein:

Figure 1 is a schematic longitudinal sectional view of a well flow conductor having a leak therein and showing a stop member positioned in said conductor, Figure 2 is a view similar to Figure 1, showing the movable closure member installed in the conductor below the leak, Figure 3 is a similar view, showing the movable closure moved to a position immediately above the leak in the conductor for indicating the position of the leak, and Figure 4 is an enlarged view, partly in elevation and partly in section, of the stop member and movable closure member in position in the well flow conductor.

In the drawings, the numeral 10 designates a well casing having a well tubing or flow conductor 11 extending downwardly therein. A packer P is illustrated as positioned between the tubing and casing near their lower end for sealing off the annular space between said tubing and casing, whereby well fluids entering the bore of the casing below the packer will be directed into the bore of the tubing 11 and will flow upwardly therethrough to the well surface in the usual manner.

An opening, perforation, or break in the wall of the well tubing 11 above the packer P is illustrated schematically at X. It will be seen, therefore, that fluids from within the bore of the tubing may pass outwardly through the break or opening X into the annular space above the packer. Since, in many high pressure wells, the casing 10 is not of adequate strength to confine the high well pressure fluids within its bore, a leak admitting such high pressure fluids into the annular space between the tubing and casing creates a dangerous condition. The casing may be ruptured entirely, or the high pressure fluids may escape through imperfect threaded connections between adjacent joints or lengths of casing and flow into earth formations, such as water zones, or the like, creating the danger of blow-outs, or other hazardous conditions.

In practicing the method of this invention for locating the leak in the well flow conductor, a stop or support member S is lowered into the tubing 11 and positioned near the lower end thereof below any position at which the leak might be found. With the packer P located between the tubing and casing, the stop may be positioned at or just immediately above the packer, since any leak below the packer will not normally affect the operation of the well. A movable closure member C is then lowered into the bore of the tubing until it engages the upper end of the stop S.

The stop member includes an elongate tubular mandrel 15 having an axial bore 16. The lower portion 17 of the mandrel is substantially cylindrical and an external annular flange 18 is provided at the upper end of its cylindrical section. Immediately above the flange 18, the mandrel is flared outwardly and upwardly to form a slip expanding section 19, and an upwardly facing annular shoulder 20 is formed at the upper end of the flared section. A retrieving connection including an undercut annular flange 21 at the upper end of the mandrel is spaced above the shoulder 20 and is adapted to be engaged by a suitable retrieving tool (not shown) whereby the stop S may be lowered into and removed from the well tubing 11. Gripping elements or slips 22 having gripping teeth on their outer surface are slidable on the flared or inclined portion 19 of the mandrel. Handles 23 depend from the slips and extend downwardly through slots 24 in the flange 18. The lower ends of the slip handles are loosely connected to a slip carrier or sleeve 25 by means of the engagement of their T-shaped lower ends within correspondingly T-shaped slots 26 provided in the slip carrier. The slips are restrained against outward displacement from the T-shaped slots by a band 27 which surrounds the carrier and is secured in an annular groove formed in its outer surface. A similar band 28 prevents outward displacement of the slip handles from the slots 24 in the annular flange 18. The slip carrier is slidable on the lower cylindrical portion 17 of the mandrel and upward movement of the slips on the mandrel is limited by the engagement of the carrier with the flange 25.

As will readily be seen, the weight of the slips and the carrier will urge them toward their lowermost position on the mandrel, engaging the flange 18. However, downward movement of the mandrel with relation to the slips will move the flared slip expanding portion 19 downwardly between the slips and force them outwardly into gripping engagement with the wall of the tubing. Such relative movement may be obtained by suddenly lowering the mandrel. The slips will remain substantially stationary, due to their inertia, and the flared portion of the mandrel will move downwardly between the slips to immediately expand them into gripping engagement with the tubing. A flexible line lowering mechanism (not shown) may be connected to the mandrel of the stop by rivets inserted through radial openings 29 provided in the retrieving flange 21 at the upper end of the mandrel. The flexible line is threaded through a stuffing box at the upper end of a lubricator housing of the usual construction (not shown) which forms an upward extension of the upper end of the well tubing above the usual surface flow control valve (not shown), and the stop and the running tools of the lowering mechanism are suspended by the flexible line within the lubricator housing. After the lubricator housing has been connected to the upper end of the tubing above the closed surface control valve, such surface valve may be opened to permit the stop and running tools to pass into the tubing below the valve. Flow of fluids through the tubing 11 and through the annular space between the tubing and casing 10 is cut off by closing the surface flow controls in the lateral flow lines therefrom during the lowering operation, so that the stop is inserted into the well without permitting the flow of fluids therefrom during the installation of the stop. The stop may then be lowered into the tubing to the desired position, whereupon the flexible line lowering mechanism may be operated to suddenly move the mandrel downwardly with respect to the slips to cause the flared section 19 to force the slips into gripping engagement with the wall of the tubing, whereupon further actuation of the flexible line lowering mechanism will shear the rivets extending through the openings 29 to release the lowering mechanism from the mandrel whereby the lowering mechanism may be removed from the tubing, leaving the stop anchored in place in the tubing.

The closure member C includes an elongate tubular mandrel 30 having an external annular shoulder 31 formed at its mid-portion. A sealing element 32, such as an inverted pump cup, is supported on the shoulder and is confined thereagainst by a wear ring 33 having an auxiliary packing ring 34 for sealing between said wear ring and the mandrel. A packing nut 35 is threaded on the upper end of the mandrel for pressing the wear ring against the pump cup.

An elongate retrieving member 36, having its upper portion reduced and provided with an external annular undercut retrieving connection 37, is also screw-threaded onto the upper end of the mandrel. The retrieving member is provided with a bore which is reduced to form a seat 38 against which a valve 39 is adapted to seat to close the bore of the retrieving member against upward flow of fluids therethrough.

The valve has a reduced elongate upstanding stem 39a which extends substantially above the upper end of the retrieving member, and has a plurality of spaced external guide fins 41 provided on its lower portion for guiding its longitudinal motion in the bore of the mandrel. A helical coil spring 42 engages the lower ends of the fins 41 and is supported at its lower end upon an internal shoulder 43 formed in a spring housing 44 which is screw-threaded into the lower end of the mandrel 30, whereby the spring exerts its force to yieldably maintain the valve 39 engaged against the seat 38 to prevent flow of fluids upwardly through the bore of the mandrel 30.

An external annular flange 45 is formed at the lower end of the spring housing and an elongate packing expanding sleeve 46, having an internal annular flange 47 which is slidably confined between the lower end of the mandrel 30 and the annular flange 45 on the spring housing, is slidable longitudinally with relation to the mandrel. The packing expanding sleeve is provided with an upwardly converging wedge surface 48 at its upper end which is adapted to engage the lower end of the pump cup or packing 32 to force the same radially outward into sealing engagement with the wall of the well tubing. A base member 49 having a flow passage 50 therein is screw-threaded into the lower end of the packing expanding sleeve and is adapted to engage the upper end of the mandrel of the stop S, as shown in Figure 4, whereby the expanding sleeve may be moved upwardly with relation to the packing cup 32 to positively force said cup into sealing engagement with the wall of the well tubing.

The closure member may be lowered into the well tubing by means of a running tool forming a part of a flexible line lowering mechanism (not shown) in the same manner as was the stop member S, the running tool being connected by rivets extending through the tool and into an annular groove 51 formed in the exterior of the retrieving flange 37 at the upper end of the closure member. Flow of fluids through the tubing and annular space between the tubing and casings is also cut off at the surface during the lowering of the closure member, so that such closure member is inserted into the well without permitting flow of fluids therefrom at the surface during the installation of the closure member. The valve 39 in the closure member is held unseated by the running tool during the lowering operation to facilitate fluids by-passing the closure member during such lowering. When the closure member has been lowered into engagement with the stop member S, the flexible line lowering mechanism may be operated to shear the rivets connecting the lowering mechanism with the closure member, whereupon a downward force may be applied against the shoulder 36a of the retrieving member. Such downward force will be transmitted to the mandrel 30 to move the mandrel and the parts carried thereby downwardly with respect to the packing expanding sleeve 46, whereby the tapered packing expanding surface 48 at the upper end of the sleeve 46 will engage the inner edge of the packing cup 32 and force the cup radially outwardly into initial positive sealing engagement with the wall of the well tubing or flow conductor 11. The flexible line lowering mechanism may then be removed from the well tubing, and the tubing surface control device closed.

After the stop member S has been lowered into and anchored within the flow conductor and the closure member C has been also lowered into the conductor and the packing cup 32 initially expanded into positive sealing engagement with the wall of said tubing, the well surface flow control (not shown) controlling flow of fluids from the annular space between the tubing 11 and the casing 10 is opened. This permits well fluids from such annular space to flow outwardly therefrom at the surface. Since the opening or leak X permits communication between the bore of the tubing 11 and the annular space between such tubing and the casing 10, it is readily apparent that fluids within the bore of the tubing will pass through the opening or leak X into the annular space and flow upwardly therein to the surface and outwardly through the open surface control. Therefore, well fluids from below the packer P will flow upwardly in the bore of the tubing 11 to the leak opening X and through said leak opening into the annular space.

Since the packing cup 32 has been initially expanded into positive sealing engagement with the wall of well pipe or tubing 11, the well fluids cannot pass exteriorly of the mandrel, and since the valve 39 closes the bore of the mandrel against upward fluid flow therethrough, it will be seen that the well fluids flowing upwardly through the tubing to the leak opening X will lift the closure member C in the tubing until the sealing cup 32 is positioned immediately above the leak opening X. As soon as the sealing cup passes the leak opening, the well fluids below the closure member C may pass outwardly through the leak opening into the annular space between the tubing and casing and upwardly therein to the surface, and the closure member will remain at a position in the tubing with the sealing cup 32 just above the leak opening. Since the control device at the surface for controlling flow of fluids through the tubing 11 remains closed, fluid within the tubing will not flow further up the tubing than the leak opening X, and the closure member will remain in position immediately adjacent such leak opening.

The position of the closure member in the tubing may then be determined by lowering a weight member or plumb-bob 55 connected to the lower end of a flexible measuring line 56 into the tubing until said weight member engages the upper end of the movable closure member. The depth in the well at which the closure member is positioned is thus determined by measuring the length of flexible measuring line and adding thereto the distance between the upper end of the closure member and the lower edge of the sealing cup. Therefore, the location of the leak in the well tubing may be adequately measured and determined, whereupon a suitable packing device, such as illustrated in the patent to Herbert C. Otis, No. 2,393,404, issued January 27, 1946, may be installed to seal off the leak opening. Or, any other desired operation may be performed on the flow conductor, with the knowledge of the exact location of the leak opening.

Once the leak opening location has been determined, in the manner hereinbefore set out, the closure member C and the stop member S may be successively removed from the flow conductor by means of a retrieving tool run into the conductor as a part of the flexible line lowering mechanism. The retrieving tool would engage under the undercut retrieving flanges at the upper ends of the closure and stop members, whereby such members could be lifted from within the conductor.

Manifestly, other leak openings in the well tubing above the opening X may be similarly located after the leak opening X has been located and sealed off. To do so would require merely relocating the stop member S above the packing sleeve closing the leak opening X and repeating the process just described.

From the foregoing, it will be seen that an improved method of locating leaks in well flow conductors in place in a well has been provided wherein the upward flow of the well fluid from the producing horizon to the leak opening is utilized in finding and indicating the location of the leak opening. This method makes it possible to locate the leak in wells having high pressure and producing gaseous fluids. It is not necessary to utilize pump rods or extraneously introduced pressure in locating the leak. Furthermore, the apparatus utilized in finding and indicating the leak opening may be completely removed from the well flow conductor after the leak has been located. Also, the method may be carried out without requiring the installation of a derrick and heavy hoisting equipment or pumping machinery, hence resulting in a substantial saving in money and time. Obviously, a plurality of leaks in the well flow conductor may be successively determined by the method outlined, and the entire operation may be carried out quickly without disturbing or interfering with the well casing, tubing, packer, or other permanent parts of the well installation.

It is also believed manifest that an improved movable closure member adapted to be inserted into the well flow conductor and to be flowed upwardly therein by the well fluid pressure to indicate the position of the leak in the conductor has been described. The improved movable closure is provided with initially ineffective sealing means and with means for positively expanding such sealing means into initial positive sealing engagement with the wall of the well flow conductor, whereby excessive flow of fluid from the well is prevented when the closure is used.

The foregoing description of the invention is explanatory only, and changes in the details of the method and construction illustrated may be made by those skilled in the art, within the scope of the appended claims, without departing from the spirit of the invention.

What I claim and desire to secure by Letters Patent is:

1. Means for locating leaks in well flow conductors in place in a well including, a stop member insertable into the bore of the well flow conductor to be anchored at a position below the leak, said stop member having a passage for permitting flow of fluids therepast through the conductor, and a movable closure member insertable into the tubing to engage and be positioned by the stop member, said closure member having means for sealing off the bore of the flow conductor, whereby fluid pressure from below the stop member may be utilized to move the movable closure member upwardly in the flow conductor.

2. A movable closure member adapted to be inserted into a well flow conductor for locating and indicating a leak opening in said conductor and including, a body having a flow passage therethrough and a valve seat in said flow passage, a valve normally biased into engagement with the seat to prevent upward fluid flow through the flow passage of the body, an annular packing member carried exteriorly of the body and having an initially unexpanded depending annular skirt, and an expander member slidable on the body below the skirt of the packing means normally out of engagement with the skirt of the packing means and movable into engagement with said skirt to expand said packing means to effective sealing position.

3. Means for locating leaks in well flow conductors in place in a well, of the character set forth in claim 1, wherein the means on the movable closure member for sealing off the bore of the flow conductor is initially ineffective, and means is carried by said closure member and arranged to be moved to expand the sealing means to effective sealing position upon engagement of the closure member with the stop member.

4. Means for locating leaks in well flow conductors in place in a well, of the character set forth in claim 1, wherein the closure member is provided with a flow passage therethrough and valve means normally biased to closed position to prevent upward flow of well fluid through said flow passage, said valve means being openable to permit fluids to by-pass said closure member.

5. Means for locating leaks in well flow conductors in place in a well, of the character set forth in claim 1, wherein the stop member is retractable from anchored position to permit said stop member to be subsequently removed from the well flow conductor.

IRA A. MILLER.

REFERENCES CITED

The following references are of record in the file of this patent:

UNITED STATES PATENTS

| Number | Name | Date |
| --- | --- | --- |
| 1,548,012 | Dunn | July 28, 1925 |
| 1,652,472 | Erwin | Dec. 13, 1927 |
| 1,736,117 | Granger | Nov. 19, 1929 |
| 1,822,925 | Granger | Sept. 15, 1931 |
| 1,966,819 | Irwin | July 17, 1934 |
| 2,164,195 | Waltermire | June 27, 1939 |
| 2,393,404 | Otis | Jan. 22, 1946 |